United States Patent [19]

Dominesey et al.

[11] Patent Number: 5,275,346

[45] Date of Patent: Jan. 4, 1994

[54] WEB CASSETTE FOR HOLDING AND DISPENSING A ROLL OF WEB MATERIAL

[75] Inventors: Andrew E. Dominesey, Rochester; Clark E. Harris, Fairport; Thomas C. Healey, Rochester; Raymond D. Hulbert, Penfield; Joel R. Shaw, Fairport, all of N.Y.

[73] Assignee: Eastman Kodak Company, Rochester, N.Y.

[21] Appl. No.: 890,889

[22] Filed: May 29, 1992

[51] Int. Cl.$^5$ .............................................. G03B 17/26
[52] U.S. Cl. .................................... 242/71.1; 242/68.4
[58] Field of Search ...................... 242/71.1, 71.7, 68.6, 242/68.4; 354/275; 206/397, 407, 409, 415, 416

[56] References Cited

U.S. PATENT DOCUMENTS

| | | | |
|---|---|---|---|
| 1,809,267 | 6/1931 | Cushing | 242/68.6 |
| 3,004,730 | 10/1961 | Gray | 242/68.6 |
| 3,831,881 | 8/1974 | Tucker | 242/194 |
| 3,865,326 | 2/1975 | Beaudoin | 242/68.6 |
| 4,535,947 | 8/1985 | Hidle | 242/68.4 X |
| 4,597,658 | 7/1986 | Buelens et al. | 354/275 |
| 4,756,418 | 7/1988 | Johanson et al. | 206/397 |
| 4,802,633 | 2/1989 | Berry | 242/71.1 |
| 4,830,305 | 5/1989 | Guggi et al. | 242/71.7 |
| 4,903,833 | 2/1990 | Berry | 206/407 |

FOREIGN PATENT DOCUMENTS 185378 10/1963 Sweden ................ 242/68.6

OTHER PUBLICATIONS

Research Disclosure Nov. 1977 #16352 by Lehmann et al.

Primary Examiner—John M. Jillions
Attorney, Agent, or Firm—Clyde E. Bailey

[57] ABSTRACT

An improved light-tight web cassette 10 is disclosed for holding and dispensing a roll of photosensitive web material. The web cassette 10 comprises a tubular core 12 onto which a roll of web 14 material is wound. A jacket 16 surrounds the web roll and is provided with side edges 18. A pair of end caps 22 is provided, each end cap 22 having a central openings 28 and a peripheral recess 24 for receiving the end edges 18 of the jacket 16 in light-tight relation. A core plug 34 is provided for each end cap 22 which is adapted, when pressed through the central opening 28 into the tubular core 16 to an assembled position, to press and hold the end edges 18 of the jacket 16 into the recesses 24 of the end caps 22 in light-tight relation. Core plugs 34, moreover, holds the end caps 22 against the end of core 12.

2 Claims, 2 Drawing Sheets

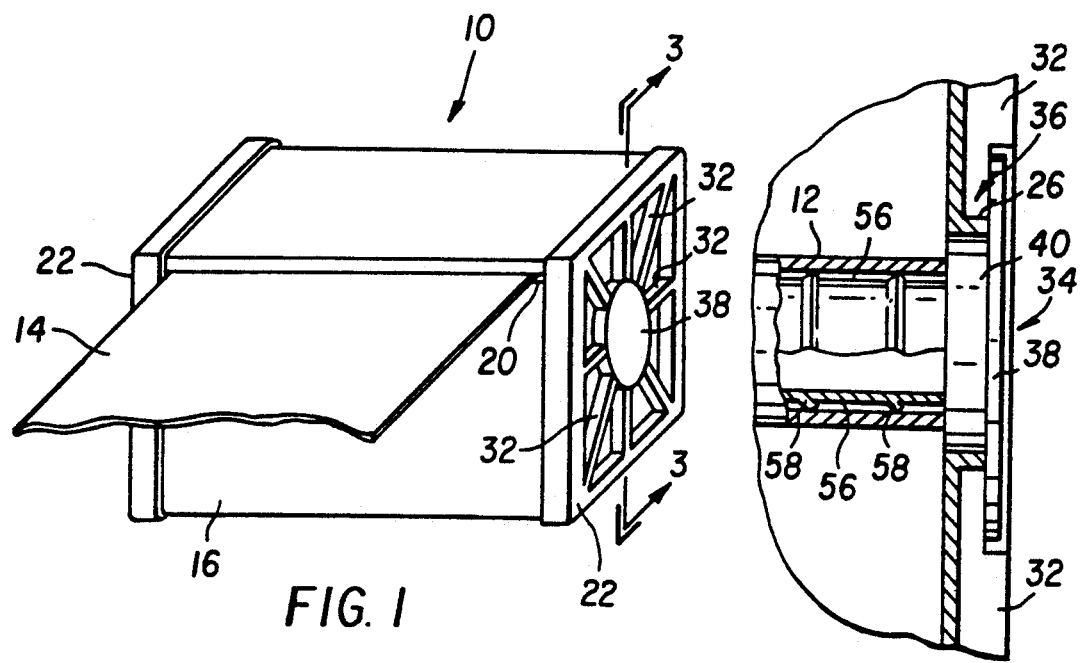
FIG. 1
FIG. 5
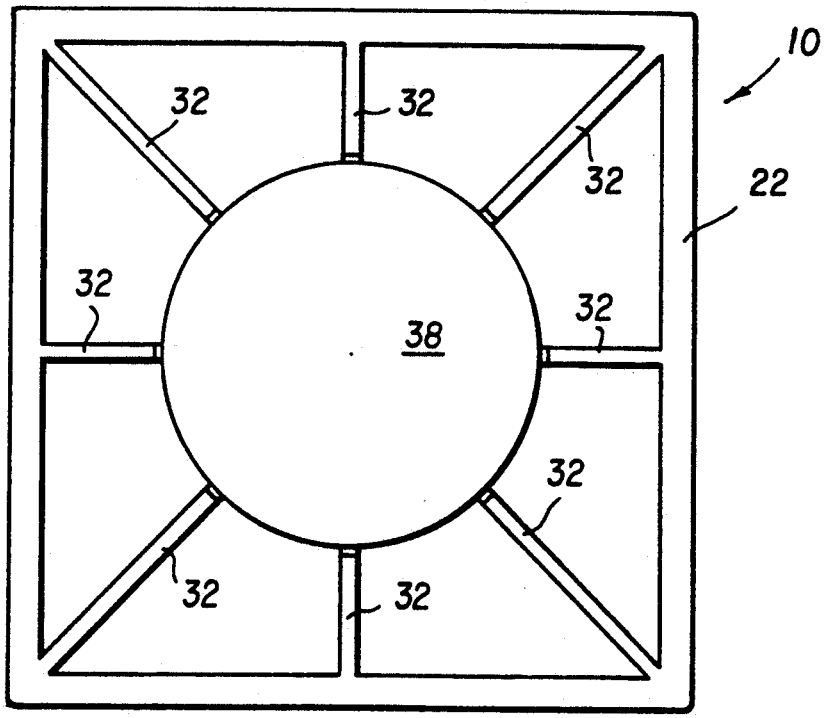
FIG. 2

WEB CASSETTE FOR HOLDING AND DISPENSING A ROLL OF WEB MATERIAL

FIELD OF THE INVENTION

The present invention relates generally to web cassettes, and more particularly to light-tight web cassettes for holding and dispensing a roll of web material.

BACKGROUND OF THE INVENTION

It is generally known in the art to provide a web cassette for holding and dispensing a roll of unexposed light-sensitive web material for use in phototypesetting apparatus, in semi-automatic process cameras, for instance, for handling diffusion transfer material in a daylight environment, etc. In such web cassettes, the end caps have peripheral slots for receiving side edges of the cassette jacket, and are secured in light-tight relation to the side edges by adhesive and/or staples.

Accordingly, a shortcoming of the prior art web cassettes is that the assembly steps of applying the adhesive to the side edges of the jacket and stapling together the mating edges of the end caps and jacket side edges adds to the cost of manufacturing the web cassettes. Therefore, a need exist for a web cassette that is easy to assemble and, thus, economical to manufacture.

SUMMARY OF THE INVENTION

It is, therefore, an object of the present invention to provide an improved light-tight web cassette for holding and dispensing a roll of photosensitive web material. Accordingly, for accomplishing these and other objects of the invention, there is provided a web cassette comprised of a tubular core onto which a roll of web material is wound to form a web roll. The core has an inner peripheral surface which defines an axial core opening. A jacket surrounding the web roll has end edges and an axially extending slot through which the web material can be withdrawn. Further, a pair of end caps have peripheral recesses for receiving the jacket side edges in light-tight relation. The end caps further have central openings in substantial alignment with the axial core opening. Each end cap, moreover, has a core plug having a head portion and a body portion of a slightly larger diameter than the diameter of the axial core opening. Hence, when the core plug body portion is pressed through the end cap central opening into the axial core opening to an assembled position, the core plug is rigidly secured to the web roll for rotation therewith, and the end caps are secured to the jacket side edges in light-tight relation.

Accordingly, an important advantage of the new and improved web cassette of this invention is the elimination of unnecessary assembly steps thereby reducing the cost to manufacture the cassette.

BRIEF DESCRIPTION OF THE DRAWINGS

The foregoing as well as other objects, features and advantages of this invention will become more apparent from the appended figures wherein like reference numerals denote like elements, and wherein:

FIG. 1 is a perspective view of a preferred embodiment of a web cassette according to the present invention;

FIG. 2 is a vertical end view of the web cassette of FIG. 1.

FIG. 5 is a segmental view in section of another embodiment of the present invention.

DETAILED DESCRIPTION OF THE INVENTION

Figures 3, 4:
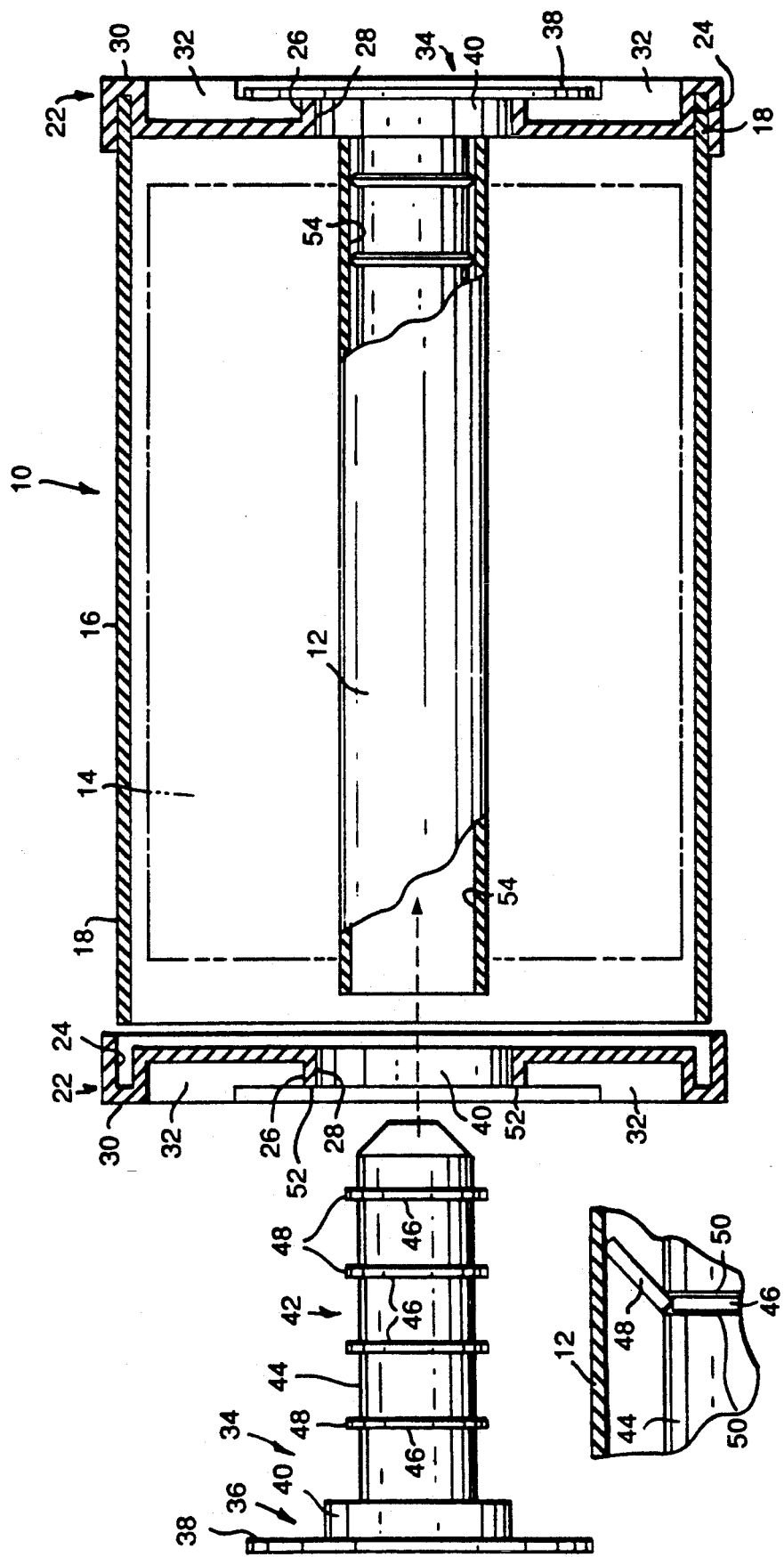
FIG. 3 is a vertical section view taken substantially along the line 3—3 of FIG. 1 with one end portion of the web cassette shown exploded.
FIG. 4 is an enlarged partial view of a section of the core plug of FIG. 3 inserted in the end cap of the web cassette of the invention.

With reference to FIGS. 1-3, a preferred embodiment of a web cassette 10 of this invention comprises a tubular core 12, onto which is wound a web 14 of photosensitive material to form a web roll. The web roll is housed within a substantially rectangular jacket 16 having end edges 18. The jacket 16 has a peripheral web exit slot 20 extending substantially from one end edge thereof to the other, through which the web 14 may be drawn from the cassette 10.

The web cassette 10 is provided with a pair of identical end caps 22, each having a peripheral recess 24 for receiving a end edge 18 of the jacket, as best seen in FIG. 3. Each of the end caps 22 has an inner cylindrical wall 26 defining a center opening 28, a peripheral bifurcated outer wall 30 defining the recess 24, and a plurality of strengthening ribs 32 radially extending from the inner wall 26 to the outer wall 30.

A pair of identical core plugs 34 are provided for securing the end caps 22 onto the end edges 18 of the jacket 16. Each of the core plugs 34 has a head portion 36 having an outer circular disk 38 and an inner cylindrical bearing 40 adapted to nest within the journal formed by the center opening 28 of the inner wall 26. Each core plug 34 further has a body portion 42 comprising a rigid cylindrical part 44 provided with a plurality of axially spaced, circumferentially extended slots 46. Each body portion 42 further has a plurality of flexible parts comprising flat washers or rings 48 which are flexibly placed onto the body portion 42 of the core plugs 34 and nest within the peripheral slots 46. The inner diameter of each ring 48 is smaller than the outer diameter of the rigid cylindrical part 44, to provide an interference fit between the inner periphery of the ring 48 and the peripheral slot 46. Each slot 46 is further provided with bevelled edges 50, as best seen in FIG. 4, to allow flexing of the ring 48 when the core plug 34 is inserted through the inner bearing wall 26 of the end cap 22 into the core opening 28. When the core plug 34 is fully inserted into its assembled position, as seen on one end in FIG. 3, the cylindrical core plug bearing 40 is journaled within the inner bearing wall 26 of the end cap 22. Also, the circular disk surface 38 bears against the end surface 52 of the bearing wall and ribbed surfaces 32 to force the end cap recesses 24 and jacket end edges 18 into a light-locked mating engagement, and to provide a light lock to prevent light from passing between the mating surfaces of the journal 40 and inner bearing wall 26 into the web cassette 10. Moreover, the length of the jacket 16 is chosen so that the cylindrical core plug 40 can not push on the ends of core 12 and prevent roll from rotating.

Also in this assembled position, the flexed rings 48 are in frictional engagement with the inner peripheral surface 54 of the core 12 to prevent withdrawal of the core plug 34 from its assembled position. This assures the securement of the end caps 22 on to the side edges 18 of the jacket 16 in light-tight relation without the necessity for adhesive and/or staples. As the web 14 is withdrawn from the web cassette 10, the web roll and core 12 are rotated along with the core plugs 34. An advantage of the core plugs 34 rotating along with the core 12 and web roll is to clearly indicate to the operator that web is being transported.

With reference to FIG. 5, another embodiment of the invention is disclosed in which identical parts are denoted by the same numerals. In this embodiment, the core plug 34 comprises a head portion 36 having an outer disk 38 and a bearing 40. The body portion in this embodiment comprises a rigid cylindrical part 56 having a plurality of integral spaced-apart flexible circumferentially extending fins 58 extending outwardly from the surface thereof. When the core plugs 34 are fully inserted into the core opening, the flexible fins 58 are bent by the core 12 in a direction to prevent withdrawal of the core plugs 34 from the core 12.

The invention has been described in detail with particular reference to a preferred embodiment thereof, but it will be understood that variations and modifications can be effected within the scope of the invention.

What we claim is:

1. A light-tight cassette for holding and dispensing a roll of photosensitive web material, said cassette comprising:

a) a tubular core onto which a roll of web material is wound to form a web roll, said core having an inner peripheral surface defining an axial core opening;

b) a jacket surrounding the web roll, the jacket having side edges and an axially extended web exit slot;

c) a pair of end caps having peripheral recesses for receiving the jacket end edges in light-tight relation, the end caps further having central openings in substantial alignment with the axial core opening, and d) a core plug for each end cap, each core plug having a head portion and a body portion, said body portion having at least one outer peripheral cylindrical ring mounted thereon and wherein the outer peripheral ring edge has a diameter greater than the diameter of the inner peripheral core surface, whereby when the core plug is pressed to its assembled position, the ring is flexed by the inner peripheral core surface into a cone-shape which interacts with the inner peripheral core surface to positively prevent withdrawal of the core plug from its assembled position.

2. A light-tight cassette recited in claim 1, wherein the rigid cylindrical part of each of the core plugs has a plurality of outwardly projecting axially spaced rings for engaging the core thereby to retain the core plugs.

* * * * *